(12) United States Patent
Lee et al.

(10) Patent No.: US 9,348,014 B2
(45) Date of Patent: May 24, 2016

(54) RADAR APPARATUS FOR VEHICLE

(71) Applicant: Hyundai Motor Company, Seoul (KR)

(72) Inventors: Seung Mok Lee, Osan-si (KR); Bock Cheol Lee, Suwon-si (KR); Phil Jung Jeong, Yongin-si (KR); Hyun Gyung Kim, Hwaseong-si (KR); Young Sub Oh, Suwon-si (KR); Dong Eun Cha, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 333 days.

(21) Appl. No.: 14/010,081

(22) Filed: Aug. 26, 2013

(65) Prior Publication Data

US 2014/0354465 A1     Dec. 4, 2014

(30) Foreign Application Priority Data

May 28, 2013    (KR) ........................ 10-2013-0060054

(51) Int. Cl.
| | |
|---|---|
| *G01S 13/93* | (2006.01) |
| *G01S 7/02* | (2006.01) |
| *H01Q 1/32* | (2006.01) |
| *H01Q 1/42* | (2006.01) |
| *G01S 17/93* | (2006.01) |
| *G01S 7/481* | (2006.01) |

(52) U.S. Cl.
CPC ................. *G01S 7/02* (2013.01); *G01S 7/4813* (2013.01); *G01S 17/936* (2013.01); *H01Q 1/3233* (2013.01); *H01Q 1/42* (2013.01); *G01S 2013/9375* (2013.01)

(58) Field of Classification Search
CPC . G01S 7/02; G01S 13/931; G01S 2013/9389; G01S 17/936; G01S 7/4813; H01Q 1/3283; H01Q 1/3291

USPC ............................................................ 342/70
See application file for complete search history.

(56) References Cited

U.S. PATENT DOCUMENTS

| | | | | |
|---|---|---|---|---|
| 6,489,927 B2* | 12/2002 | LeBlanc | ............ | B60K 31/0008 342/198 |
| 6,720,884 B2* | 4/2004 | O'Connor | ............... | B60R 11/02 172/6 |
| 7,604,269 B2* | 10/2009 | Matsubara | .............. | B60R 19/26 188/371 |
| 7,675,460 B2* | 3/2010 | Sanada | .................. | G01S 7/4026 180/167 |
| 7,988,212 B2* | 8/2011 | Hartley | ................. | B60R 19/483 293/117 |
| 2005/0062641 A1* | 3/2005 | Kakishita | .................. | G01S 7/03 342/70 |
| 2010/0321230 A1* | 12/2010 | Takeuchi | .................. | G01S 7/03 342/70 |
| 2011/0047784 A1* | 3/2011 | Ohtake | .................... | H01Q 1/42 29/600 |

(Continued)

FOREIGN PATENT DOCUMENTS

| | | |
|---|---|---|
| JP | 9-218257 A | 8/1997 |
| JP | 2000-159039 A | 6/2000 |

(Continued)

*Primary Examiner* — John B Sotomayor
*Assistant Examiner* — Marcus Windrich
(74) *Attorney, Agent, or Firm* — Morgan, Lewis & Bockius LLP

(57) ABSTRACT

A radar apparatus for a vehicle includes a radar unit provided at an inner side of a radiator grill for a vehicle, a multi-layer transmission cover which is fitted into the radar unit and on a front surface of which a plurality of transmission layers through which a radar beam radiated through the radar unit transmits are formed, and a mounting portion in which a connection body formed by connecting the multi-layer transmission cover to the radar unit is connected to a vehicle body.

15 Claims, 4 Drawing Sheets

(56) References Cited

U.S. PATENT DOCUMENTS

| | | | |
|---|---|---|---|
| 2012/0007764 A1* | 1/2012 | Kawasaki | B60R 19/483 342/70 |
| 2013/0141269 A1* | 6/2013 | Schneider | H01Q 1/3233 342/70 |
| 2014/0111370 A1* | 4/2014 | Aleem | B60R 19/483 342/70 |

FOREIGN PATENT DOCUMENTS

| | | |
|---|---|---|
| JP | 2005-112193 A | 4/2005 |
| JP | 2006-281841 A | 10/2006 |
| JP | 2010-010100 A | 1/2010 |
| JP | 2012-107913 A | 6/2012 |
| JP | 2012-112660 A | 6/2012 |
| KR | 10-2009-0034149 A | 4/2009 |

* cited by examiner

RADAR APPARATUS FOR VEHICLE

CROSS-REFERENCE TO RELATED APPLICATION

The present application claims priority of Korean Patent Application Number 10-2013-0060054 filed May 28, 2013, the entire contents of which application is incorporated herein for all purposes by this reference.

BACKGROUND OF INVENTION

1. Field of Invention

The present disclosure relates to a radar apparatus for a vehicle, including a radar unit and a transmission layer through which radar beam transmits in a front of a vehicle.

2. Description of Related Art

Generally, a radar apparatus used for sensing a distance from another vehicle running in front of a vehicle and pedestrians, or for sensing lanes in an automatic driving system, etc. is installed to the vehicle. Such a radar apparatus is arranged usually at the rear of a radiator grill, that is, at a center of a front of a vehicle, for securing performance such as quick response, etc.

FIG. 1 is a view showing a conventional radar apparatus installed at the front of a vehicle wherein a radar unit 20 formed with a radome cover 10 is fixed to a vehicle body at the rear of a radiator grill (RG) using a fixation bracket 40 and a separate radar transmission cover 30 is formed on the RG such that a laser beam generated from the radar unit 20 is radiated through the transmission cover 30 after passing through the radome cover 10.

As described above, since laser beam passes through a plurality of transmission components, the laser beam is interfered with the components, causing increases of angular velocity and bending angle of the laser beam, and thus a front transmission cover is enlarged to ensure a laser transmission area. Additionally, the number of components for installing a laser apparatus to a vehicle body increases, causing increases of a vehicle weight and material cost, and a panel and a radar apparatus are damaged when a vehicle comes into a head-on collision.

In order to solve the problems as described above, a device for improving position precision degree of a radar apparatus has been disclosed in Japanese Patent Laid Open No. 10-2010-10100 A, entitled "Lightening Apparatus for a vehicle". However, in consideration of heat resistance conditions, regulations on lamp light distribution, appearance exposure, etc., it is not easy to apply such a device to a real vehicle, and when a vehicle collides at a low speed, expensive lamp and radar apparatus are damaged and load is transferred directly to a vehicle body to damage a panel. Additionally, there occurs a disadvantage that it is difficult to ensure the waterproofing of front and rear lamps when assembling a radar unit.

Accordingly, a radar apparatus is required, which does not affect the appearance of a vehicle while not interfering with laser beam radiated from a laser apparatus, and in which a laser unit is not damaged when a vehicle comes into a head-on collision, and which can be assembled simply to a vehicle body.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of present invention has been made in an effort to solve the above-described problems associated with prior art. Various aspects of the present invention provide for a radar apparatus for a vehicle, which does not affect the appearance of a vehicle while not interfering with laser beam radiated from a laser apparatus, and in which a laser unit is not damaged when a vehicle comes into a head-on collision, and which may be assembled simply to a vehicle body.

Various aspects of the present invention provide for a radar apparatus for a vehicle may includes a radar unit provided at an inner side of a radiator grill for a vehicle, a multi-layer transmission cover which is fitted into the radar unit and on a front surface of which a plurality of transmission layers through which a radar beam radiated through the radar unit transmits are formed, and a mounting portion in which a connection body formed by connecting the multi-layer transmission cover to the radar unit is connected to a vehicle body.

The transmission layer of the multi-layer transmission may be composed of a transparent resin layer formed at the outermost of the multi-layer transmission cover, a base that makes a thickness of the transparent resin layer uniform, and a metallic layer to which a metallic effect same as the appearance of a radiator grill is applied.

The transmission layer of the multi-layer transmission cover may be slanted at an angle such that the layer gradually becomes wider in downward direction from an upward portion to form a same plane as the radiator grill.

The multi-layer transmission cover may be shaped as a cover that covers a front surface of the radar unit.

The mounting portion may include: a supporting portion provided with a supporting bar that is extended downward vertically from a lower side of the connection body and a sliding bar that is extended in a left and right direction of a vehicle at a lower side of the supporting bar; and a guide portion which is extended vertically from a vehicle body, and an upper end of which is bent to a front surface and the bent portion is divided into plural segments to form a grip portions at both sides where the supporting bar is fixed therebetween and a sliding portion at a center to which the sliding bar is fixed.

The sections of the supporting bars and the sliding bars may have inversed "T" shapes.

A catching groove that is indented inwardly may be formed at the lower side of the sliding bar and a catching protrusion is formed at the upper side of the sliding portion wherein the catching protrusion is fitted into the catching groove.

A catching protrusion may be formed at the lower side of the sliding bar and a catching groove may be formed at the upper side of the sliding portion wherein the catching protrusion is fitted into the catching groove.

The catching protrusion may be formed to have a slope that is gradually raised from a front to a rear of a vehicle so that when a car comes into a heads-on collision, the catching groove rides over the catching protrusion to be slid thereover for the sliding bar of the connection body to be separated toward a rear of a vehicle.

In the guide portion, a grip hole may be formed between inner both sides of the grip portion and a side hole is formed at a side of the sliding portion wherein a sectional area of the side hole is larger than that of the grip hole.

In the guide portion a height of the sliding portion may be lower than that of the grip portion.

The front ends of the grip portion and the slinging portion of the guide portion may be bent to form an easy slope upwardly or downwardly.

The supporting portion may be formed at a lower side of the multi-layer transmission cover.

The supporting portion may be formed at a lower side of the radar unit.

The supporting portion may be formed by a plurality.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
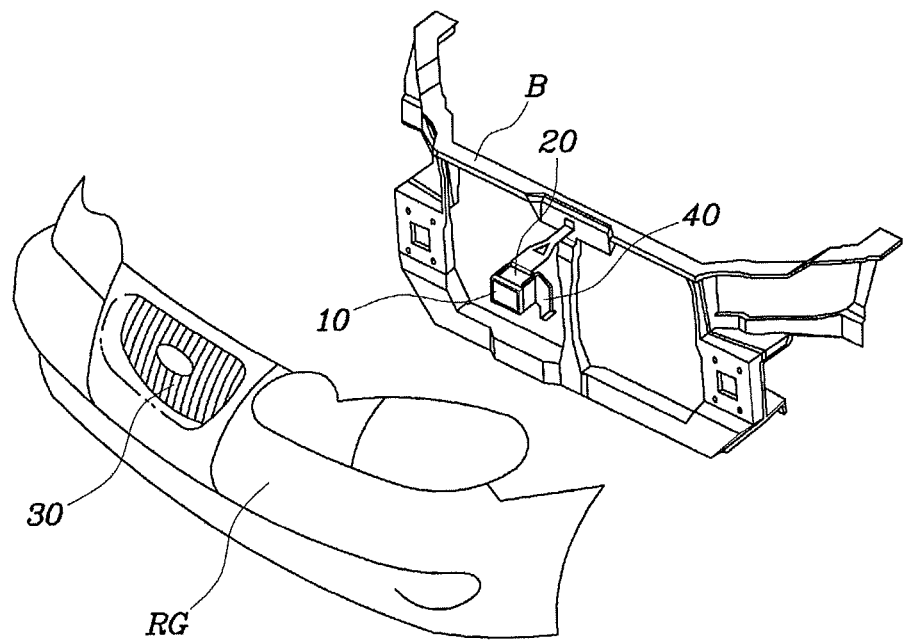
FIG. 1 is a view showing a conventional radar apparatus for a vehicle according to a related art.
Figure 2:
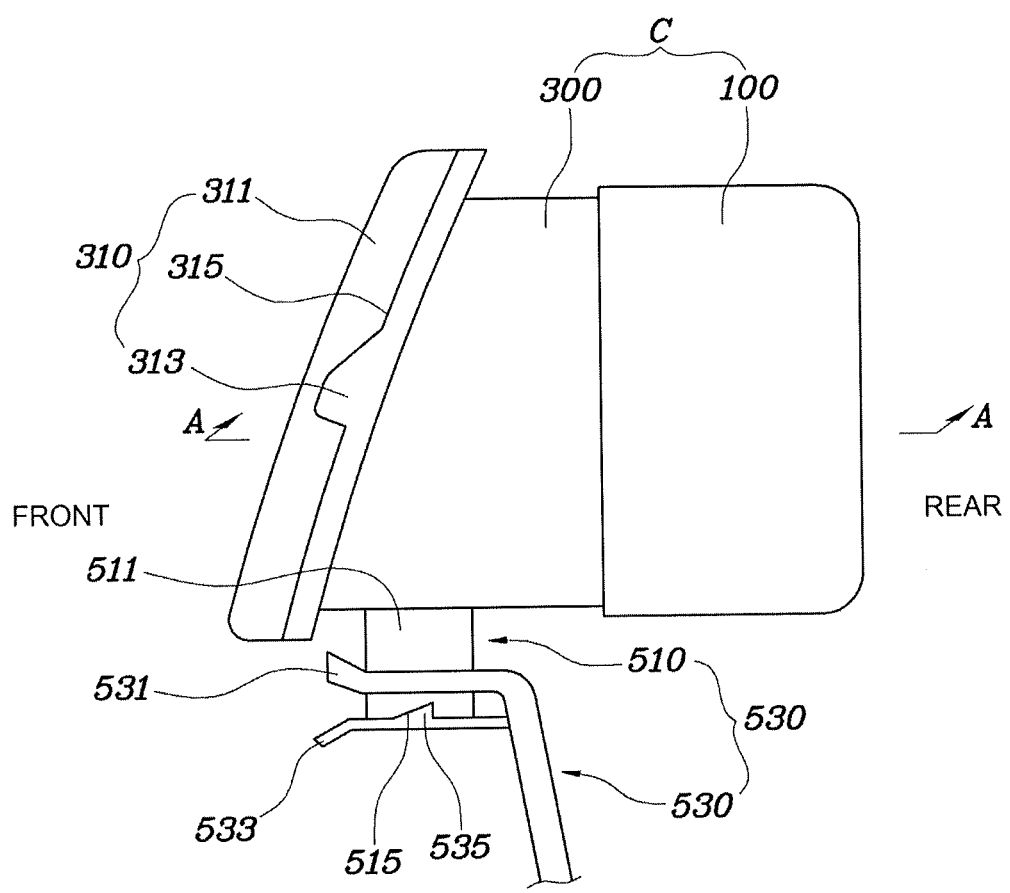
FIG. 2 is a view showing an exemplary radar apparatus for a vehicle according to the present invention.
Figure 3:
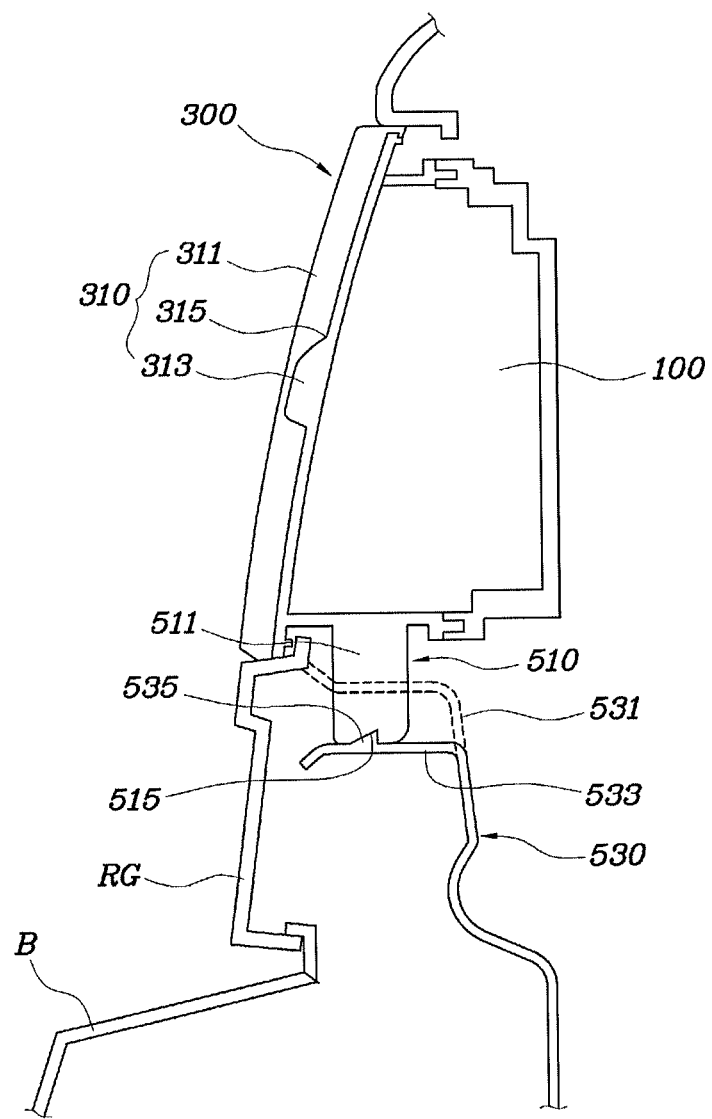
FIG. 3 is a sectional view taken along line A-A of FIG. 2.
Figure 4:
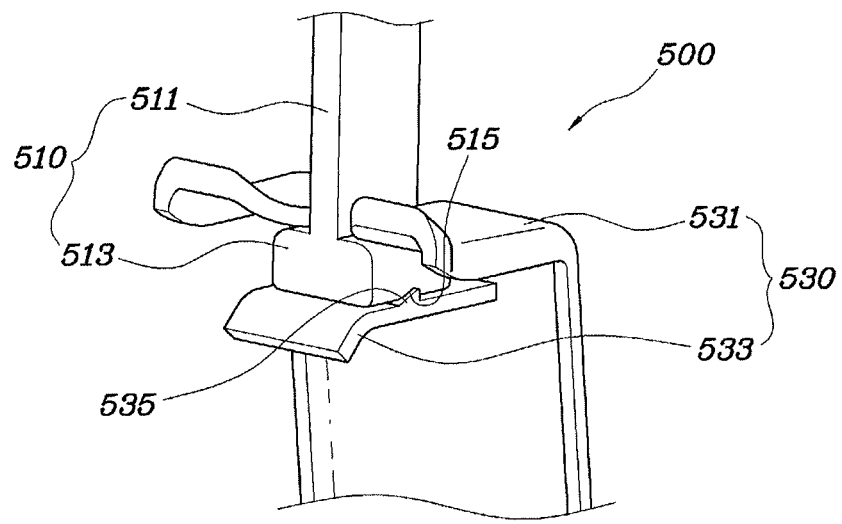
FIG. 4 is a perspective view showing a mounting portion of FIG. 2 viewed from a front of a vehicle.
Figure 5:
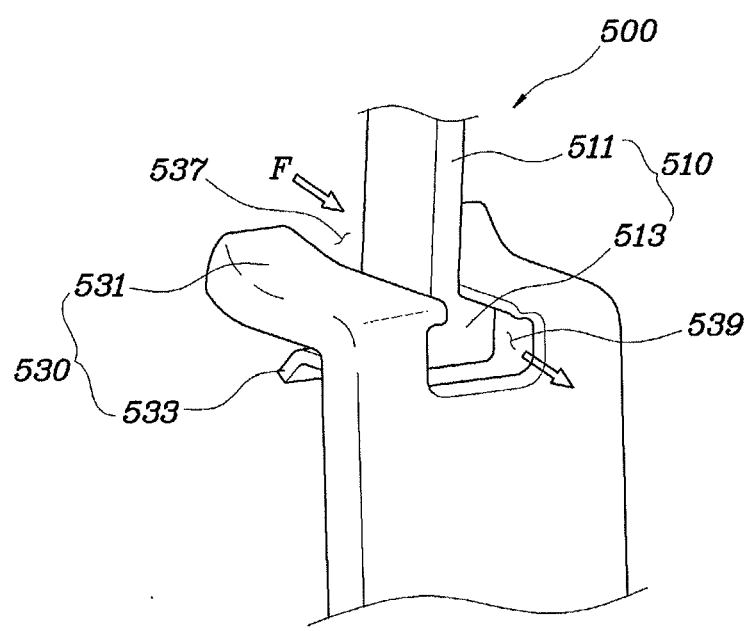
FIG. 5 is a perspective view showing a mounting portion of FIG. 2 viewed from a rear of a vehicle.

FIG. 2 is a view showing a radar apparatus for a vehicle according to various embodiments of the present invention, and FIG. 3 is a sectional view taken along line A-A of FIG. 2. FIG. 4 is a perspective view showing a mounting portion 500 of FIG. 2 viewed from a front of a vehicle, and FIG. 5 is a perspective view showing a mounting portion 500 of FIG. 2 viewed from a rear front of a vehicle.

The radar apparatus for a vehicle according to various embodiments of the present invention includes a radar unit 100 which is provided at an inner side of a radiator grill GR of a vehicle, a multi-layer transmission cover 300 which is fitted into the radar unit 100 and at a front surface of which a plurality of transmission layers 310 through which a radar beam radiated through the radar unit 100 transmits are formed, and a mounting portion 500 for mounting a connection body C formed by connecting the multi-layer transmission cover 300 to the radar unit 100 to a vehicle body B.

The radar unit 100 is disposed towards a front of a vehicle, and the multi-layer transmission cover 300 is shaped as a cover that covers a front surface of the radar unit 100. The transmission layer 310 of the multi-layer transmission cover 300 may include a transparent resin layer 311 formed at the outermost of the multi-layer transmission cover 300, a base 313 that makes a thickness of the transparent resin layer 311 uniform, and a metallic layer 315 to which a metallic effect same as the appearance of a radiator grill RG is applied wherein the metallic layer 315 is disposed between transparent resin layers 311 and the base 313 to make a metallic effect same as the radiator grill RG.

Additionally, a connective hole is formed at a center of the radiator grill RG to connect the radar apparatus thereto wherein the transmission layer 310 of the multi-layer transmission cover 300 may be slanted at an angle such that the layer gradually becomes wider in downward direction from an upward portion to form a same plane as the radiator grill RG. Here, the multi-layer transmission cover 300 is shaped as a cover to seal tightly the radar unit 100, thereby prevent foreign substance such as water, dust, etc. from being introduced into the radar unit 100.

According to the radar apparatus for a vehicle as configured above, since installation of the radome that has been formed in a front of a conventional radar unit is omitted and the multi-layer transmission cover is connected directly to the radiator grill, the number of the transmission layers through which radar beam transmits are decreased thereby to reduce the interference of radar beam with the components. Further, the radar apparatus is simplified by omitting installation of the radome to reduce a space for arranging the components and weight of a vehicle, thereby saving cost. Meanwhile, the beauty of a vehicle can be improved by reducing the size of a radar beam transmission cover since a transmission layer is disposed directly on a radiator grill of the outermost side of the vehicle.

Additionally, the mounting portion 500 that fixes the connection body C formed by connecting the radar unit 100 to the multi-layer transmission cover 300 to the vehicle body B may include: a supporting portion 510 provided with a supporting bar 511 that is extended downward vertically from a lower side of the connection body C and a sliding bar 513 that is extended in a left and right direction of a vehicle at a lower side of the supporting bar 511; and a guide portion 530 which is extended vertically from a vehicle body B, and an upper end of which is bent to a front surface and the bent portion is divided into plural segments to form a grip portions 531 at both sides where the supporting bar 511 is fixed therebetween and a sliding portion 533 at a center to which the sliding bar 513 is fixed.

Here, the supporting portion 510 may be one or more, and may be disposed at a lower side of the multi-layer transmission cover 300 or at a lower side of the radar unit 100. However, in various embodiments of the present invention, in order to cope with manufacturing, assemblage, etc. of components more efficiently, one supporting portion 510 is formed at a lower side of the multi-layer transmission cover 300, but the layout may be varied without limitation according to the design of each vehicle.

Sections of the supporting bar 511 formed vertically and the sliding bar 513 that is formed at a lower side of the supporting bar 511 vertically thereto and shaped as a plate having a thickness in a left and right direction of a vehicle are inversed "T" shapes, thereby connecting firmly and stably the connection body C to the vehicle body B.

A catching groove 515 that is gradually deeper from a front to a rear of a vehicle is formed at the lower side of the sliding bar 513 and a catching protrusion 535 formed with a slope that is gradually raised from a front to a rear of a vehicle is formed at the upper side of the sliding portion 533 wherein the catching protrusion 535 is fitted into the catching groove 15.

Accordingly, when fixing the connection body to a vehicle body, the connection body is pushed at a front of a vehicle such that the catching groove 515 of the sliding bar 513 is to be caught over the catching protrusion 535 of the sliding portion 533 so that the radar apparatus can be assembled easily and simply, and connected always to the same position thereby to maintain the optimal performance thereof and reduce the risk of inferior assemblage.

Additionally, as shown in drawings, since the catching protrusion 535 of the sliding portion 533 is formed to have a slope that is gradually raised from a front to a rear of a vehicle, the force is generated due to impact when a car comes into a heads-on collision such that the catching groove 515 rides over the catching protrusion 535 to be slid thereover so that the sliding bar 513 of the connection body C is separated toward a rear of a vehicle, thereby saving repair expense of the expensive radar apparatus.

Contrary to the configuration of the catching groove and the catching protrusion as described above, the catching protrusion may be formed at a lower side of the sliding bar and the catching groove may be formed at an upper side of the sliding portion wherein the catching protrusion is fitted into the catching groove.

The guide portion 530 is a bracket of a plate shape, which is formed at an upper side of a front back beam formed a rear of a bumper of a vehicle, or formed to be connected to the back beam, and the upper side thereof is bent at about 90 degrees towards a front of a vehicle and the bent portion is divided front/rearward into 3 segments wherein the segments at both side form the grip portion 531 and a central segment forms the sliding portion 533.

A grip hole 537 is formed in a front and rear direction of a vehicle by the sides of the center of the grip portion 531 wherein the grip hole 537 supports the supporting bars 511 at both sides at usual times, thereby to prevent the connection body C from shaking due to vibration or impact during a driving of a vehicle.

The sliding portion 533 is formed such that its height is lower than that of the grip portion 531 and the sliding bar 513 is connected to the sliding portion 533 to support the connection body C. In accordance with difference of sectional areas of the supporting bars 511 and the sliding bar 513 of the supporting portion 510, the sectional area of a side hole 539 formed at the side of the sliding portion 533 is larger than that of the grip hole 537 formed by the grip portion 531 so that the connection body C can be easily separated towards the rear of a vehicle when the vehicle comes into a heads-on collision.

Further, a front end of the grip portion 531 of the guide portion 530 is bent to form an easy slope upwardly (or downwardly), and a front end of the sliding portion 533 is bent to slope easily downwardly (or upwardly), thereby to prevent a pedestrian from injury by the guide portion 530 when a car comes into a heads-on collision.

According to the radar apparatus for a vehicle as configured above, since installation of the radome that has been formed in a front of a conventional radar unit is omitted and the multi-layer transmission cover is connected directly to the radiator grill, the number of the transmission layers through which radar beam transmits are decreased thereby to reduce the interference of radar beam with the components. Further, the radar apparatus is simplified by omitting installation of the radome to reduce a space for the components and weight of a vehicle, thereby saving cost and improving assemblage efficiency.

Additionally, the radar apparatus can be always assembled to the same position by the catching groove and the catching protrusion without separate special device to maintain the performance of the radar apparatus as an optimal condition and reduce the risk of inferior assemblage. Additionally, the beauty of a vehicle can be improved by reducing the size of a radar beam transmission cover since a transmission layer is formed directly on a radiator grill at the outermost of the vehicle, and further repair expense can be reduced by preventing the radar apparatus from being damaged while protecting a pedestrian from injury when the vehicle collides.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A radar apparatus for a vehicle comprising:
   a radar unit provided adjacent an inner side of a radiator grill for a vehicle;
   a multi-layer transmission cover fitted on the radar unit and including a front surface having a plurality of transmission layers through which a radar beam radiated from the radar unit transmits; and
   a mounting portion including a connection body connecting the multi-layer transmission cover to the radar unit, the mounting portion also being connected to a vehicle body,
   wherein the mounting portion comprises:
      a supporting portion provided with a supporting bar that is extended downward vertically from a lower side of the connection body and a sliding bar that is extended in a left and right direction of a vehicle at a lower side of the supporting bar; and
      a guide portion which is extended vertically from a vehicle body, and an upper end of which is bent to a front surface and the bent portion is divided into plural segments to form a grip portions at both sides where the supporting bar is fixed therebetween and a sliding portion at a center to which the sliding bar is fixed.

2. The radar apparatus for the vehicle of claim 1, wherein the transmission layer of the multi-layer transmission cover is composed of a transparent resin layer formed at the outermost of the multi-layer transmission cover, a base that makes a thickness of the transparent resin layer uniform, and a metallic layer having a metallic effect similar to a metallic appearance of a radiator grill.

3. The radar apparatus for the vehicle of claim 1, wherein the transmission layer of the multi-layer transmission cover is slanted at an angle such that the layer gradually becomes wider in downward direction from an upward portion to form a plane that is parallel to a radiator grill.

4. The radar apparatus for the vehicle according to claim 1, wherein the multi-layer transmission cover is shaped to cover a front surface of the radar unit.

5. The radar apparatus for the vehicle according to claim 1, wherein sections of the supporting bars and the sliding bars have inversed "T" shapes.

6. The radar apparatus for the vehicle according to claim 1, wherein an upwardly indented catching groove is formed at the lower side of the sliding bar and a catching protrusion is formed at the upper side of the sliding portion wherein the catching protrusion is fitted into the catching groove.

7. The radar apparatus for the vehicle according to claim 6, wherein the catching protrusion has a slope that is gradually raised from a front to a rear of a vehicle so that, during a head-on collision, the catching groove rides over the catching protrusion to be slid thereover for the sliding bar of the connection body to be separated toward a rear of a vehicle.

8. The radar apparatus for the vehicle according to claim 1, wherein a catching protrusion is formed at the lower side of the sliding bar and a catching groove is formed at the upper side of the sliding portion wherein the catching protrusion is fitted into the catching groove.

9. The radar apparatus for the vehicle according to claim 8, wherein the catching protrusion has a slope that is gradually raised from a front to a rear of a vehicle so that, during a head-on collision, the catching groove rides over the catching protrusion to be slid thereover for the sliding bar of the connection body to be separated toward a rear of a vehicle.

10. The radar apparatus for the vehicle according to claim 1, wherein in the guide portion, a grip hole is formed between inner both sides of the grip portion and a side hole is formed at a side of the sliding portion wherein a sectional area of the side hole is larger than that of the grip hole.

11. The radar apparatus for the vehicle according to claim 1, wherein in the guide portion a height of the sliding portion is lower than that of the grip portion.

12. The radar apparatus for the vehicle according to claim 1, wherein the front ends of the grip portion and the slinging portion of the guide portion are bent to form an easy slope upwardly or downwardly.

13. The radar apparatus for the vehicle according to claim 1, wherein the supporting portion is formed at a lower side of the multi-layer transmission cover.

14. The radar apparatus for the vehicle according to claim 1, wherein the supporting portion is formed at a lower side of the radar unit.

15. The radar apparatus for the vehicle according to claim 1, wherein the supporting portion includes a plurality of supporting portions.

* * * * *